United States Patent
Mogalapalli et al.

(10) Patent No.: US 10,176,493 B2
(45) Date of Patent: Jan. 8, 2019

(54) SYSTEM AND METHOD FOR COMPENSATING TELECOMMUNICATION SUBSCRIBERS FOR PERMITTING PLAYING OF ADVERTISEMENTS AS RING BACK TONES AND DIRECT ACTIVATION OF ADVERTISED SERVICES

(75) Inventors: Srinivas N. Mogalapalli, Bangalore (IN); Hemant S. Madkaikar, Bangalore (IN)

(73) Assignee: Onmobile Global Limited, Bangalore (IN)

( * ) Notice: Subject to any disclaimer, the term of this patent is extended or adjusted under 35 U.S.C. 154(b) by 376 days.

(21) Appl. No.: 13/876,359

(22) PCT Filed: Aug. 2, 2011

(86) PCT No.: PCT/IN2011/000507
§ 371 (c)(1),
(2), (4) Date: Mar. 27, 2013

(87) PCT Pub. No.: WO2012/042527
PCT Pub. Date: Apr. 5, 2012

(65) Prior Publication Data
US 2013/0185151 A1  Jul. 18, 2013

(30) Foreign Application Priority Data
Sep. 27, 2010  (IN) .......................... 2827/CHE/2010

(51) Int. Cl.
*G06Q 30/02* (2012.01)
*H04M 3/42* (2006.01)
*H04M 3/487* (2006.01)

(52) U.S. Cl.
CPC ......... *G06Q 30/0251* (2013.01); *G06Q 30/02* (2013.01); *G06Q 30/0267* (2013.01); *H04M 3/42017* (2013.01); *H04M 3/4878* (2013.01)

(58) Field of Classification Search
CPC ............ G06Q 30/0275; G06Q 30/02–30/0277
(Continued)

(56) References Cited

U.S. PATENT DOCUMENTS

| 6,236,365 B1 * | 5/2001 | LeBlanc | G01C 21/206 342/450 |
| 8,295,804 B2 * | 10/2012 | Bosan | H04L 12/14 379/114.13 |

(Continued)

FOREIGN PATENT DOCUMENTS

WO  2007005917 A2  1/2007
WO  2009084002 A2  7/2009

*Primary Examiner* — Jamie R Kucab
(74) *Attorney, Agent, or Firm* — Hoffmann & Baron, LLP

(57) ABSTRACT

A system and method for compensating subscribers for permitting playing of advertisements as ring back tones and direct activation of advertised services is provided. The method includes receiving by a telecommunication service provider a call initiated by a caller. The method further includes establishing status of at least one of caller and callee by checking home location register of the telecommunication service provider. Establishing status includes determining RBT subscription status of caller and callee. Depending on the RBT subscription status of caller and callee, the call is transferred to a tone player within RBT system of at least one of caller and callee. A compensation system then selects a media file to be played to caller based on RBT to Advertisement ratios of subscribers. The selected media file may be an RBT file or an advertisement message, which is then played to the caller.

26 Claims, 5 Drawing Sheets

(58) Field of Classification Search
USPC ..... 705/14.49, 14.5, 14.64, 14.68, 14.69, 14
See application file for complete search history.

(56) References Cited

U.S. PATENT DOCUMENTS

| | | | |
|---|---|---|---|
| 2001/0051517 A1* | 12/2001 | Strietzel | H04M 3/4878 |
| | | | 455/414.1 |
| 2004/0223468 A1* | 11/2004 | Benco | H04L 12/14 |
| | | | 370/329 |
| 2008/0162584 A1* | 7/2008 | Papili | G06Q 10/087 |
| 2008/0215725 A1* | 9/2008 | Backer | H04L 67/22 |
| | | | 709/224 |
| 2009/0265220 A1 | 10/2009 | Bayraktar et al. | |
| 2010/0027776 A1* | 2/2010 | Stifelman | H04M 3/42017 |
| | | | 379/207.16 |
| 2010/0274672 A1* | 10/2010 | Patel | G06Q 30/02 |
| | | | 705/14.66 |
| 2010/0313095 A1* | 12/2010 | Dinan | H04L 1/1816 |
| | | | 714/749 |
| 2014/0074618 A1* | 3/2014 | Agarwal | G06Q 30/0264 |
| | | | 705/14.64 |
| 2014/0324584 A1* | 10/2014 | Nelson | G06Q 30/0257 |
| | | | 705/14.55 |

* cited by examiner

SYSTEM AND METHOD FOR COMPENSATING TELECOMMUNICATION SUBSCRIBERS FOR PERMITTING PLAYING OF ADVERTISEMENTS AS RING BACK TONES AND DIRECT ACTIVATION OF ADVERTISED SERVICES

FIELD OF INVENTION

The present invention relates generally to delivery of advertisements to telecommunication subscribers through ring back tones. More particularly, system and method of the present invention compensates users for playing advertisements as ring back tones and direct activation of advertised services.

BACKGROUND OF THE INVENTION

Primary services offered by commonly used telecommunication systems include allowing a calling party to connect to a called party through a telecommunication network. Commonly used telecommunication networks include landline networks such as Public Switched Telephone Networks and Wireless Communication Networks such as Cellular Networks.

Typically, Telecommunication Service Providers (TSPs) provide telephone and related communication services to subscribed users of telecommunication services. Apart from providing traditional services (for example, voice calls, fax transmissions and the like); nowadays telecommunication service providers also provide subscribed users with a number of value added services such as Short Message Service (SMS), Multimedia Message Service (MMS), call forwarding, ring back tone etc. In a telecommunication network, when a caller makes a call to a callee using a communication terminal, the caller hears a call progress tone. The call progress tone is heard by the caller till the callee responds to the call and initiates a conversation with the caller. The call progress tone may include, without limitation, a ring back tone (RBT), a call busy tone and a call waiting tone. RBT is usually a monotonous sound heard by a caller while waiting for a callee to respond to a call. An RBT may be replaced by other tones, for example, songs, personalized messages, advertisements, music, news, sports commentary etc.

Nowadays, telecommunication service providers allow a user to set an RBT of his or her choice by subscribing to an RBT service. The RBT service enables the RBT subscriber to choose a particular tone as the RBT. The chosen RBT of the user may be a song, an advertisement, a personalized message by the user or even an interactive game with a caller. Currently there is no active participation of an RBT subscriber (either caller or callee) in promoting and popularizing the RBT (especially if the RBT is an advertisement) and various other Value Added Services (VAS) that may be advertised in an RBT. In current RBT service implementations, a subscriber, such as a callee/caller may get financial benefits for setting advertisements as RBTs. However, receiving financial benefits alone may not be motivational enough for a callee/caller to take an initiative for letting the usage of his RBT service for playing advertisements as RBT. Further, a caller who listens to an advertisement as RBT, while a call to a callee is being connected, does not receive any additional benefit (apart from listening to the advertisement).

Due to the highly competitive nature of telecommunication industry, telecommunication service providers are constantly motivated to increase advertising revenues. Thus, there exists a need to encourage RBT subscribers (callee as well as caller) to actively participate in promoting and using advertisements as RBTs by providing RBT subscribers with benefits.

SUMMARY OF THE INVENTION

A method and system for compensating subscribers of a Telecommunication Service Provider (TSP) for permitting playing of advertisements as ring back tones and direct activation of advertised services is provided. In various embodiments of the present invention, the system of the invention includes a Data Center operationally connected to the TSP and including a User Interface configured to be used by one or more users for creating campaigns. Creation of campaigns includes specifying advertisement messages to be played based on one or more targeting parameters. The Data Center further includes a Campaign Database configured to store advertisement messages created by a user of the one or more users and a Campaign Controller configured to manage delivery of advertisements to a server for playing, and further configured to control frequency and exposure of advertisements per campaign per user based on inputs given by the one or more users.

In various embodiments of the present invention, the system of the invention includes an Advertisement Server located within the TSP network and configured to receive delivery of advertisements from the Campaign Controller, to store media files as advertisements in databases within one or more RBT systems of TSP network. The Advertisement Server is further configured to establish frequency and mix of RBT and advertisements to be played to callers of a callee and to establish frequency and mix of RBT and advertisements to be played to a caller based on pre-defined criteria derived from the one or more targeting parameters.

In various embodiments of the present invention, the user is at least one of an advertiser, a sales agency, a TSP and a third party agency involved in creating or managing advertisement campaigns.

In various embodiments of the present invention, the one or more targeting parameters includes at least one of subscriber profile, caller profile, location of caller, location of subscriber, telecommunication circle where caller is located, telecommunication circle where subscriber is located, time of day during which call is made by caller and time of day during which call is received by subscriber. In an embodiment of the present invention, a targeting parameter may be profile information of callee.

In various embodiments of the present invention, the pre-defined criteria includes at least one of telecommunication circle of caller, origin of caller's TSP, ratio of RBT to advertisements for callers that belong to same TSP as callee, ratio of RBT to advertisements for caller of TSP which do not belong to same TSP as callee and type of advertisements to be played and frequency of particular advertisement to be played to particular caller.

In various embodiments of the present invention, the Advertisement Server includes a Compensation System comprising a Rules Engine configured to define rules for setting frequency and mix of RBT and advertisements to be played to callers based on rate plans and terms of service agreed upon between the TSP and subscribers, wherein the terms of service are based on the pre-defined criteria. A Cross TSP database configured to identify origin of caller's network. The Compensation System further includes a Tracking Module configured to keep track of last played media file to caller and history of media files played based on rules defined in the Rules Engine. The Tracking Module is further configured to provide identifiers to tone players of the one or more RBT systems for playing advertisement media files and to direct tone players to play RBT files.

In various embodiments of the present invention, the Advertisement Server includes a Response Execution System comprising a Response Recording Module configured to record response of caller provided in the form of DTMF inputs. The Response Execution System further includes a Response Execution Module configured to poll up responses from the Response Recording Module along with caller's MSISDN and advertisement identifier and to ascertain rules and conditions set for the particular advertisement identifier, and further configured to initiate an action in conformance with caller responses.

In various embodiments of the present invention, the system of the invention includes a service activation system operationally connected to the Response Execution Module and configured to directly activate a service selected by caller as DTMF input response.

In various embodiments of the present invention, the system of the invention includes a Short Message Service Center operationally connected to Response Execution Module and configured to send a short message service message as a response selected by caller in the form of DTMF input response and initiated by the Response Execution Module.

In various embodiments of the present invention, the system of the invention includes an Email Notification Module operationally connected to Response Execution Module and configured to deliver an email to a pre-configured email-id including MSISDN of caller and in response to advertisement played to the caller.

In an embodiment of the present invention, the system of the invention includes an AOBD system configured to connect a caller to an advertiser in response to a DTMF input response by the caller.

In an embodiment of the present invention, the system of the invention includes a Reports Module configured to collate responses received by Response Recording Module into an End of Day Report. The Reports Module is further configured to email End of Day report to pre-configured email-id's of advertisers along with information such as MSISDNs of callers and their corresponding responses.

In an embodiment of the present invention, the Tracking Module is operationally connected to tone players of the one or more RBT systems via low latency connectivity.

In various embodiments of the present invention, a method for serving advertisements as Ring Back Tones (RBTs) for subscribers of a Telecommunication Service Provider (TSP) and compensating subscribers for permitting the use of advertisements as ring back tones is provided. The method steps include receiving call initiated by caller, wherein the call is received by TSP MSC of callee. The method further includes establishing status of at least one of caller and callee by checking HLR of the TSP. The step of establishing status includes determining RBT subscription status of caller and callee. Following the step of status establishment, the call is transferred to tone player within RBT system of at least one of the caller and the callee. Thereafter, a compensation system is invoked for checking whereabouts of caller. Upon invocation of the compensation system, media file to be played to caller is determined based on RBT to Advertisement ratios. RBT to Advertisement ratios are defined based on rate plans and terms of service between subscribers and the TSP, wherein the terms of service are based on criteria that includes at least one of telecommunication circle of caller, origin of caller's TSP, callers belonging to same TSP as callee, callers of TSP not belonging to same TSP as callee, callee profile information, caller profile information, type of advertisements to be played for callees that are subscribers, frequency of particular advertisement to be played to particular caller and RBT to advertisement ratios for callers that are subscribers. The method further includes playing the selected media file to caller, wherein the selected media file is at least one of an RBT file and an advertisement message.

In various embodiments of the present invention, last played media file played for a subscriber is determined prior to determining media file to be played to caller.

In various embodiments of the present invention, the method further comprises recording one or more DTMF responses selected by the caller in response to playing an advertisement message. The one or more responses are recorded along with caller's MSISDN and advertisement identifier. The method further includes initiating an action based on the one or more DTMF responses, wherein the action is initiated based on pre-defined rules and conditions corresponding to the advertisement identifier.

In an embodiment of the present invention, the initiated action includes sending an electronic message detailing information required by the caller in the form of an SMS. In another embodiment of the present invention, the initiated action includes activating a service selected by the caller as a DTMF response. In yet another embodiment of the present invention, the initiated action includes initiating an AOBD call to connect the caller to the advertiser based on DTMF response selected by the caller. In yet another embodiment of the present invention, the initiated action includes comprises sending an email alert to pre-configured email identifier of an advertiser of the advertisement message played as ring back tone.

BRIEF DESCRIPTION OF THE ACCOMPANYING DRAWINGS

The present invention is described by way of embodiments illustrated in the accompanying drawings wherein.

Figure 3:
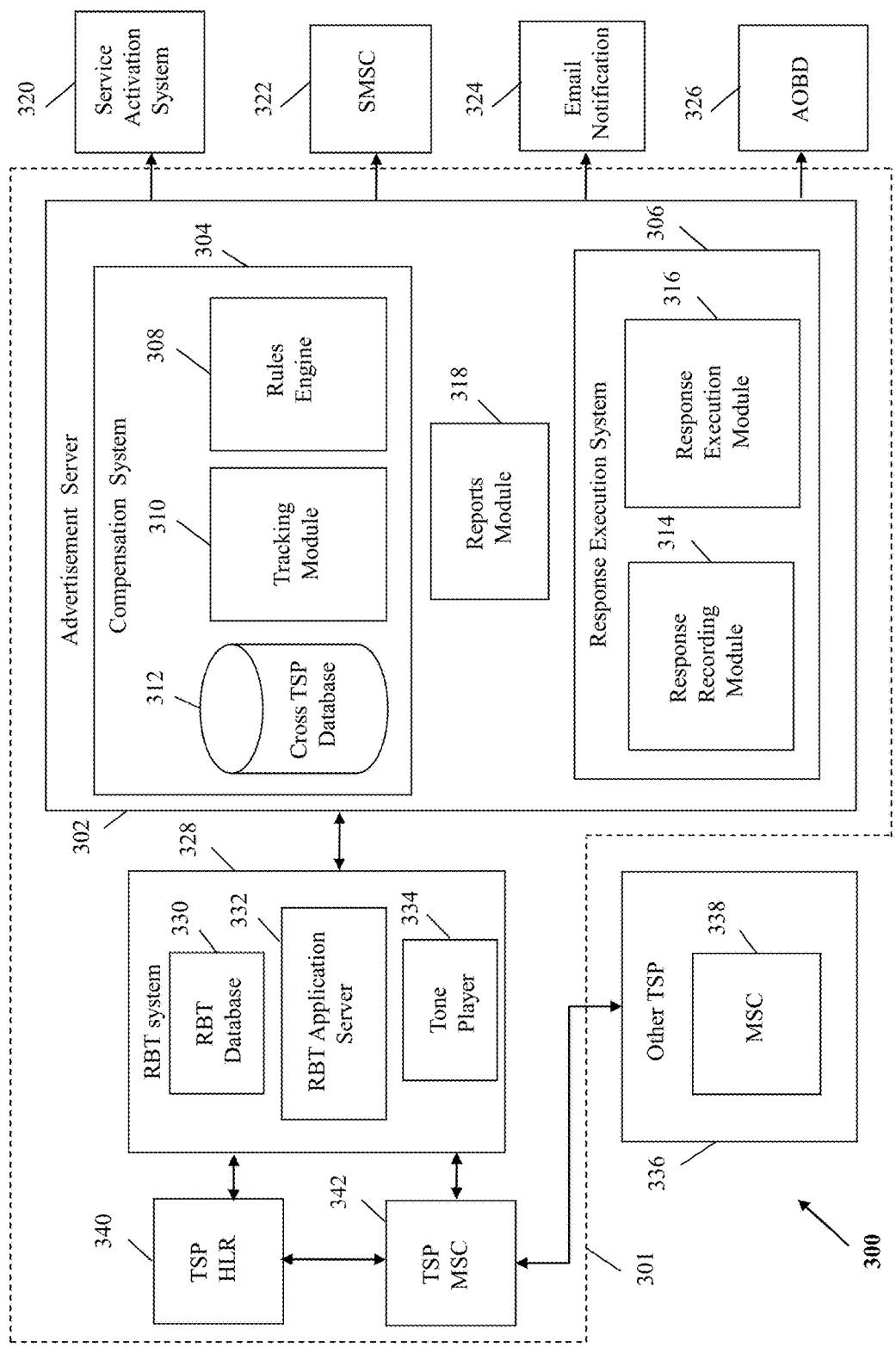
Figure 4:
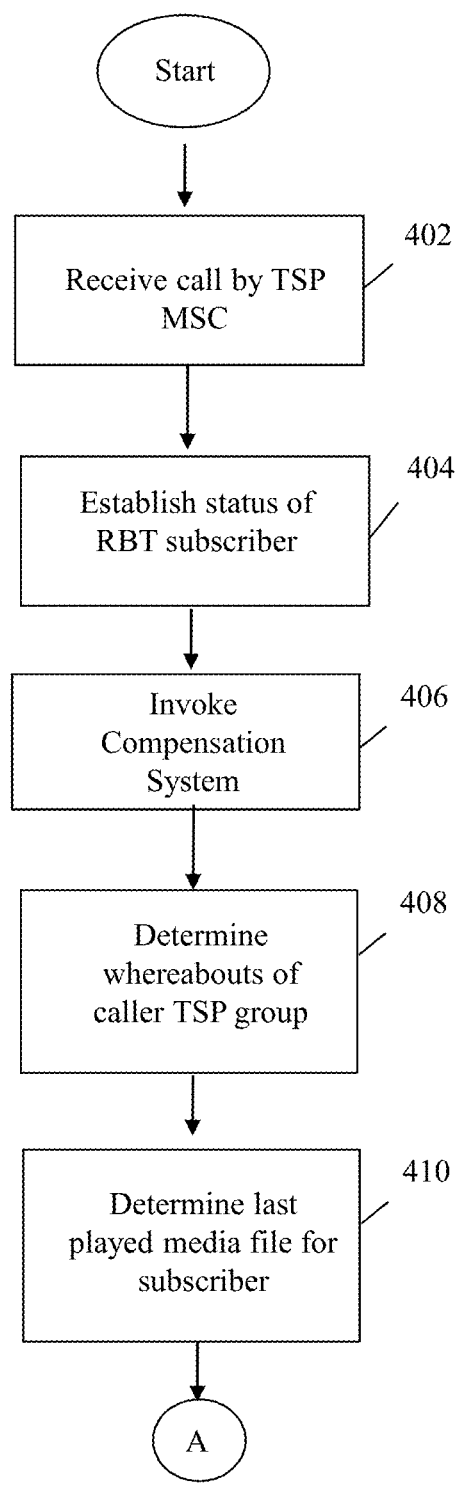
Figure 5:
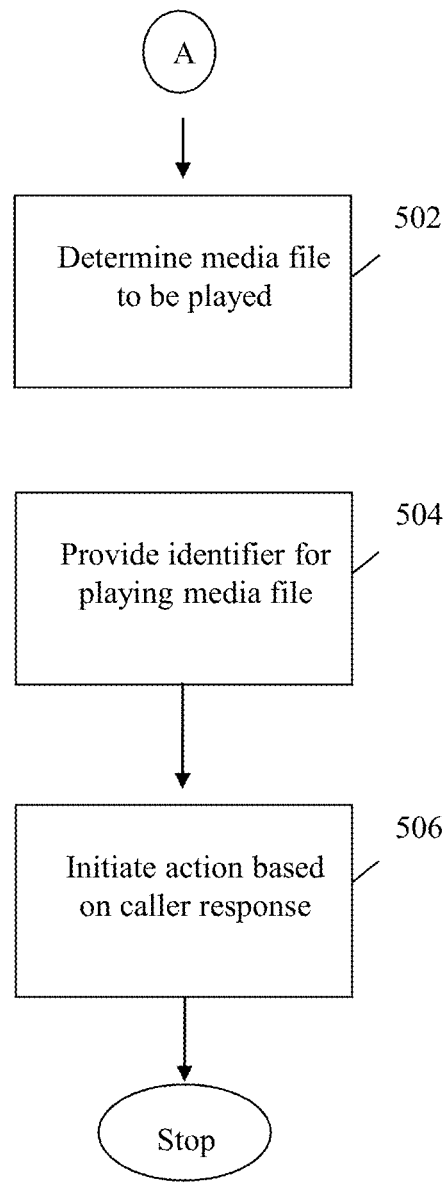

FIG. 3 illustrates schematic block diagram of a system 300 depicting elements of Advertisement Server operating in conjunction with elements of a TSP in order to compensate telecommunication users and enable direct activation of advertised services; and FIGS. 4 and 5 illustrates a flowchart depicting a sequence of steps for providing compensation to telecommunication users and enabling direct activation of advertised services.

DETAILED DESCRIPTION OF THE INVENTION

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the spirit and scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purpose of clarity, details relating to technical material that is known in the technical fields related to the invention have been briefly described or omitted so as not to unnecessarily obscure the present invention.

The present invention would now be discussed in context of embodiments as illustrated in the accompanying drawings.

Figure 1:
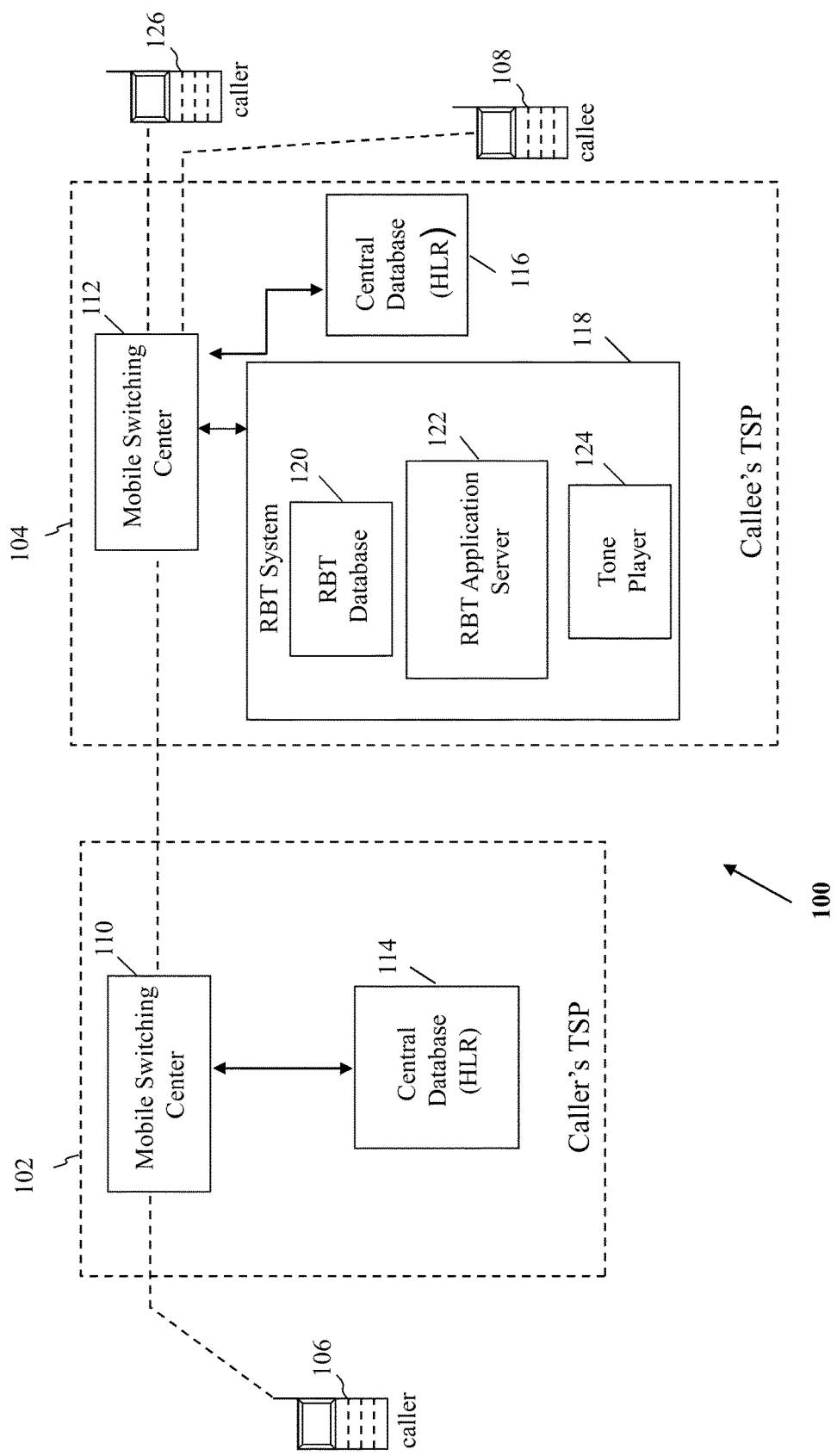
FIG. 1 is a schematic diagram illustrating a telecommunication system providing RBT services to subscribers.

FIG. 1 is a schematic diagram illustrating a telecommunication system 100 providing RBT services to subscribers, in accordance with an embodiment of the present invention. The telecommunication system 100 includes telecommunication service providers 102 and 104 hosting system elements for provisioning telecommunication services to subscribers registered with them. In an embodiment of the present invention, for enabling communication between a caller 106 and a callee 108, their respective Mobile Switching Centers 110 and 112 that are located respectively within telecommunication service providers 102 and 104 execute call switching and routing functions. Central databases 114 and 116 are used to store subscription information of subscribers of Telecommunication Service Providers (TSPs) 102 and 104. An example of a central database may be a telecom service provider Home Location Register (HLR). The subscription information of each subscriber may include without limitation, information regarding a unique identifier for the subscriber, name, location, mobile phone number, information whether a subscriber is an RBT service subscriber etc.

Caller 106 and callee 108 may use a telecommunication terminal such as a landline telephone, mobile phone, for communicating with each other. As shown in the figure, in addition to Mobile Switching Center 112, TSP 104 includes RBT system 118 for provisioning ring back tones to callers making a call to callees subscribed to TSP 104. In an exemplary embodiment of the present invention, TSP 102 may also include an RBT system for servicing RBTs on behalf of subscribers of TSP 102. For facilitating generation and provision of ring back tones, RBT system 118 includes RBT database 120, RBT application server 122 and Tone Player 124. RBT Database 120 comprises subscription information related to service subscription of RBT subscribers. Subscription information may include phone number of RBT subscribers, time of RBT subscription, one or more RBTs used by RBT subscriber, RBT Identifiers (IDs) of one or more RBTs etc. In an embodiment of the present invention, each RBT is associated with an RBT ID which is a unique identifier for a particular RBT. Subscription information also includes charges for registration, charges for accessing any particular RBT service and other related information. Further, RBT Database 120 also contains information stored by different applications from time to time.

In various embodiments of the present invention, Tone Player 124 includes a tone player database for storing RBTs to be played to caller 106, which are media files, such as music and song clips, advertisements, teasers, interactive messages and the likes. A Tone Player database stores without limitation, RBTs to be played, respective RBT IDs of the RBTs, phone/mobile numbers of the subscribers of the RBT service and the like. Tone Player 124 further includes signaling and media cards. Signaling cards are used to communicate with MSC for obtaining calls received by callee's MSC 112 for playing RBTs. Further, signaling cards are configured to release call to MSC 112 when callee 108 picks up the call due to which Tone Player 124 has to end playing of the RBT. Media Cards in the Tone Player 124 are used to play stored media files as RBTs.

RBT application server 122 executes tasks such as receiving inputs related to RBT services from voice portals, Short Message Service (SMS) etc. Further, RBT application server 122 handles financial transactions related to RBT services, such as charging subscribers for using the services.

In various embodiments of the present invention, caller 106 subscribed to TSP 102 initiates a call with the callee 108 subscribed to TSP 104 by using a mobile phone. MSC 110 receives the call request and establishes a connection with callee 108 through MSC 112 of the callee's TSP. In an embodiment of the present invention, MSC 112 checks with HLR 116 for RBT subscription of callee 108. In case, callee 108 is subscribed to RBT service, the call is forwarded to the RBT system 118 by a switch at MSC 112. RBT system 118 then plays the RBT of callee to caller via the tone player 124.

In an embodiment of the present invention, caller 126 subscribed to TSP 104 may initiate call with callee 108. In this embodiment MSC 112 establishes a connection between caller 126 and callee 108.

In another embodiment of the present invention, caller 126 subscribed to TSP 104 may initiate a call with the callee 108 or a callee belonging to any other TSP. MSC 112 checks with HLR 116 for RBT subscription of caller 126 subscribed to TSP 104. In case caller 126 is subscribed to RBT service, the call is forwarded to RBT system 118 through MSC 112. RBT system 118 then plays an RBT set by caller 126 to itself. In another embodiment of the invention, in case neither callers 106 and 126, nor the callee 108 is subscribed to RBT service, the call is still forwarded to RBT system 118 using a switch at MSC 112 to play an RBT to caller.

Figure 2:
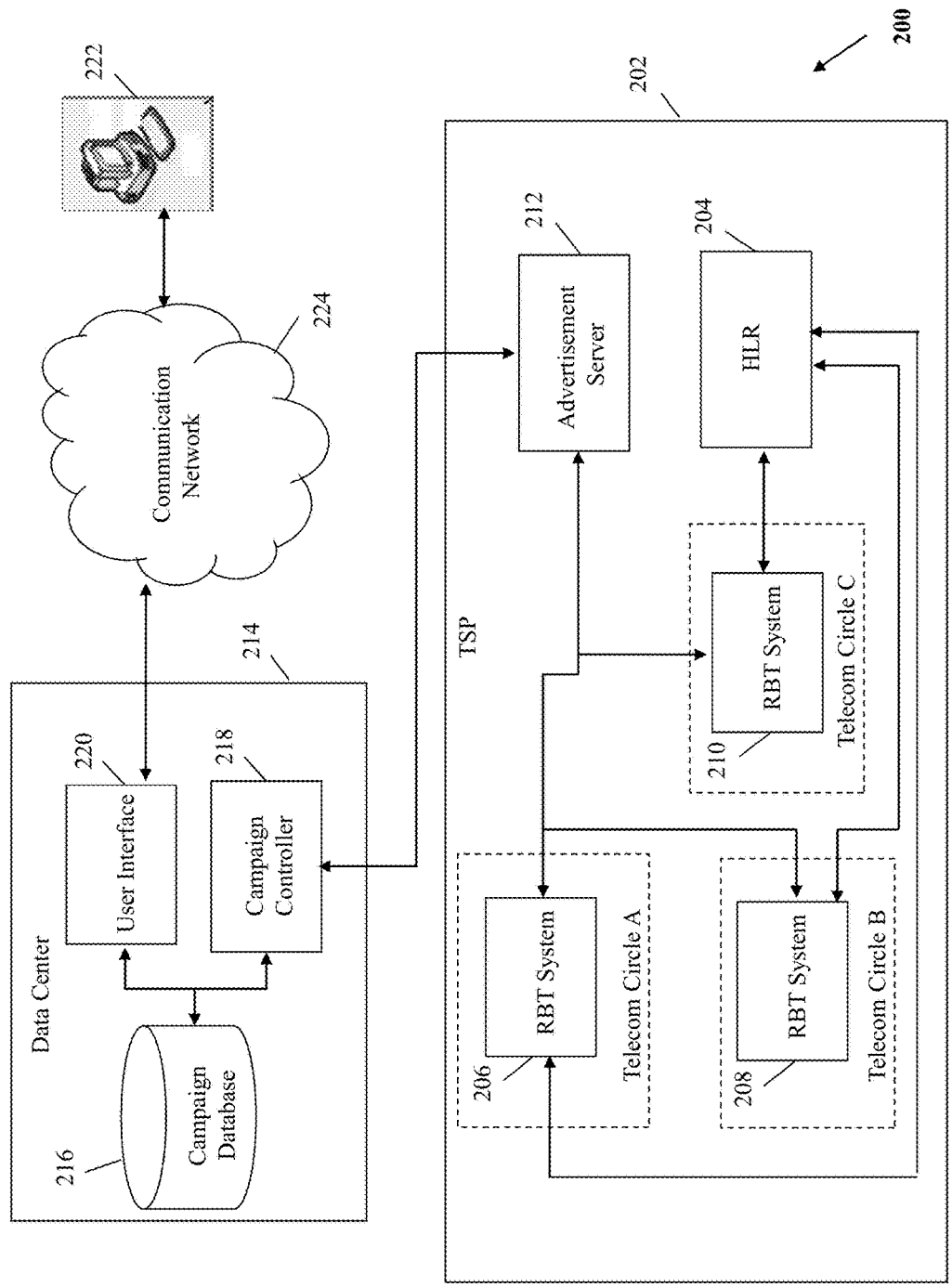
FIG. 2 illustrates elements of an architectural framework 200 of the present invention integrated with a central RBT setup of a TSP's network for providing advertisements as ring back tones.

FIG. 2 illustrates elements of an architectural framework 200 of the present invention integrated with a central RBT setup of a TSP's network for providing advertisements as ring back tones. TSP 202 is a telecommunication network comprising infrastructural components (as described for the telecommunication network 102) employed by a TSP for establishing call connections between caller and callee. TSP is a service provider that provides telecommunication services to subscribers through legally acquired frequency spectrum license from a licensing authority.

In the specific case of TSP being a mobile network operator, TSP 202 comprises basic infrastructural components such as HLR 204 and Mobile Switching Center (not shown in the figure). Further, telecommunication network of TSP 202 comprises RBT systems' 206, 208 and 210 catering to specific telecommunication circles A, B, and C respectively. A Telecommunication Circle is a territory, which is part of a larger area for which the Licensing Authority has authority to grant License of operations, for which a TSP has the License to provide Telecommunication Services. A Telecommunication Circle may also refer to a territory within the larger area, which may be identified by the TSP as an operating zone. Each RBT system includes an Application Server, one or many Tone Players and an RBT database for playing ring back tones for subscribers located within a specific Telecommunication Circle based on RBT subscription information. HLR 204 is a Home Location Register comprising information uniquely identifying subscribers, such as, name, location, mobile phone number etc.

In various embodiments of the present invention, TSP 202 includes an Advertisement Server 212. Advertisement Server 212 is deployed at TSP 202 and is configured to facilitate playing advertisements as ring back tones for subscribers of TSP 202 and enabling provision of compensation to subscribers. Advertisement server 212 is operationally connected to tone players within RBT systems 206, 208 and 210 via low latency connectivity. Low latency connectivity forms a critical component for delivery of the information from Advertisement Server 212 to tone players within RBT systems' 206, 208 and 210 as till the time an appropriate RBT to be played to the caller is determined, call placed by caller to callee is on hold at callees MSC, i.e. call is not forwarded to the callee. This time should be kept to minimum and is usually within the range of 1-5 seconds. In an embodiment of the present invention, for playing advertisement as RBT a tone player within an RBT system requests for an identifier of the advertisement and upon receiving the identifier, the tone player plays the advertisement. In an exemplary embodiment of the present invention, low latency connectivity between Advertisement Server 212 and RBT systems' 206, 208 and 210 is ensured using User Datagram Protocol (UDP) for data transfer.

In an embodiment of the present invention, Advertisement server 212 is configured to work in conjunction with multiple tone players in order to provision advertisements to subscribers registered with Telecom Circle A, Telecom Circle B and Telecom Circle C. Tone players within RBT systems 206, 208 and 210 are in turn connected to Mobile Switching Center for delivering advertisements to the caller and callee.

As shown in the figure, Advertisement Server 212 is operationally connected to a Data Center 214. Data Center 214 is a computer system housing system components for communicating with Advertisement Server 212 for executing workflows related to creation and provisioning of advertisements as ring back tones. As shown in the figure, primary elements of Data Center 214 include Campaign Database 216, Campaign Controller 218 and User Interface 220. By using User Interface 220, a user 222 may create or manage campaigns for promoting advertisements. An advertisement campaign includes a series of advertisement messages for promoting products or services. User 222 may be an advertiser, a sales agency, a TSP or a third party agency involved in creating or managing advertisement campaigns. User 222 interacts with Data Center 214 through Communication Network 224. Communication Network 224 may be an IP-based network for communication between User 222 and Data Center 214 through a broadband connection. Communication Network 224 may be implemented in a wireless fashion e.g. using wireless protocols and technologies, such as, WiFi, WiMax etc or any combination thereof. In some embodiments, Communication Network 224 may also be a packet switched network such as a local area network, wide area network, metropolitan area network, Internet network, or any other similar type of network environment including equipment for receiving and transmitting signals. User 222 creates advertisement campaigns for one or more products or services through User Interface 220. Creating campaigns includes creating advertisement messages using software tools and then storing the messages in Campaign Database 216.

An important element of creating campaigns includes User 222 specifying advertisement targeting criteria, including but not limited to, time based targeting and region based targeting of advertisements, as well as user profile based targeting of advertisements. As part of creating advertisement messages, User 222 may specify criteria related to messages which may include one or more targeting parameters. Targeting parameters may be based on callers and/or callee's profile information, location of caller or callee/subscriber, telecommunication circle where caller or callee/subscriber is located, time of day during which call is made by the caller or received by callee/subscriber etc. For example, in an embodiment of the present invention, the targeting parameter may be profile information of caller. In another embodiment of the present invention, the targeting parameter may be profile information of callee. In yet another embodiment of the present invention, the targeting parameter may be location of the caller. An advertiser may create an advertisement campaign including advertisements listing restaurants targeting callers based on their location with respect to telecommunication circles. In yet another embodiment of the present invention, the targeting parameter may be time of day during which a call is made by the caller or call is received by a callee. For example, an advertiser may create an advertisement campaign that comprises advertisements listing events within a city corresponding to time of day. The created advertisement messages (in the form of campaigns) are then stored in Campaign Database 216. Campaign Controller 218 is a module arranged to manage delivery of advertisements to Advertisement Server 212 based on campaigns set by users and stored in Campaign Database 216. In an embodiment of the present invention, advertisements in the form of media files and campaign data are received by Advertisement Server 212. Media files and campaign data are accorded individual identifiers by Campaign Controller 218. Media files are then forwarded to RBT systems' 206, 208 and 210 to be stored within their respective tone player databases.

In an embodiment of the present invention, Advertisement Server 212 receives a request from a tone player for an advertisement identifier corresponding to a subscriber for which an advertisement is to be played. Advertisement Server 212 is configured to respond to the tone player with the advertisement identifier and based on the identifier received, the tone player plays the advertisement. Detailed functioning of Advertisement Server 212 is described as part of description of FIG. 3.

In various embodiments of the present invention, Campaign Controller 218 is also configured to control exposure and frequency of advertisements per campaign, per user based on inputs received through user interface 220. Further, Campaign Controller 218 is configured to generate reports such as campaign publishing report response distribution by region for a given period of time. Further, the reports include distribution by time, day, TSP, and other targeting criteria for the campaign. The reports may be tailored as per campaigns. Also, the reports may be illustrated in tabular and graphical representations. Reports may also be exported to MS Excel or PDF formats. Campaign Controller 218 provides the reports to Advertisement Server 212 which then uses the reports to record and disseminate statistical information about advertisements.

FIG. 3 illustrates schematic block diagram of a system 300 depicting elements of Advertisement Server operating in conjunction with other elements of a TSP in order to compensate telecommunication users and enable direct activation of advertised services. As described with respect to FIG. 2, Advertisement Server 302 is hosted as part of TSP 301 with whom one or more subscribers are registered for providing advertisements as ring back tones to callers. As shown in the figure, Advertisement Server 302 is operationally connected to following components of TSP 301: RBT system 328, TSP HLR 340 and TSP MSC 342. TSP HLR 340 is a central database holding subscription information of subscribers of TSP 301. It will be apparent to a person skilled in the art that within TSP 301, there may be multiple MSCs and RBT systems corresponding to multiple Telecom Circles with Advertisement Server 302 operationally connected to each RBT system for serving advertisements as ring back tones for subscribers within each Telecom Circle.

When a caller makes a call to a callee, the call is received by TSP MSC 342. TSP MSC 342 receives the call request and places the call on hold, till the time a determination regarding which media file is to be played to the caller is made by Advertisement Server 302. Firstly, a connection is established with the callee. TSP MSC 342 checks with TSP HLR 340 for RBT subscription of the callee. In case, the callee is subscribed to RBT service, call is forwarded to RBT system 328 by using a switch at TSP MSC 342. RBT system 328 then plays RBT of callee to caller via the tone player 334. In another embodiment of the present invention, TSP MSC 342 checks with TSP HLR 340 for RBT subscription of caller. In case the caller is subscribed to RBT service, the call is forwarded to RBT system 328 through a switch at TSP MSC 342. RBT system 328 then plays RBT set by caller to caller. In another embodiment of the invention, in case neither caller nor callee is subscribed to RBT, the call is still forwarded to RBT system 328 using a switch at MSC to play an RBT to caller. In various embodiments of the present invention, RBT system 328 communicates with Advertisement Server 302 for playing advertisements as ring back tones and further for providing compensation to callee for playing advertisements as ring back tones.

Primary elements of Advertisement Server 302 that operate to provide compensation include a Compensation System 304 and a Response Execution System 306. Compensation System 304 includes Rules Engine 308, Tracking Module 310 and Cross TSP Database 312. For the purpose of this invention, providing compensation to a subscriber includes providing free or subsidized subscription to an RBT of his choice. The free or subsidized RBT will be played to a caller that makes a call to subscriber or to the subscriber when he makes a call, wherein playing of RBT is interleaved with playing of advertisements based on predetermined ratios of RBT to advertisements. In an embodiment of the present invention, ratios of RBTs to advertisements are specified for subscribers based on various rate plans and terms of the service offered. As described hereafter, ratios of RBTs to advertisements are set within Rules Engine 308.

As described earlier with respect to FIG. 2, a user who can be an advertiser, a sales agency, a TSP or a third party agency creates unique advertisement campaigns corresponding to specific targeting parameters. In an embodiment of the present invention, an advertisement campaign may comprise a list of advertisements corresponding to subscriber profile, for example, for a subscriber with interest in sports, the campaign may comprise a list of advertisements related to sports. The advertisement campaigns are then stored within a campaign database in the Data Center (FIG. 2). In an embodiment of the present invention, advertisement campaign data stored in campaign database of Data Center is relayed to Advertisement Server 302. Within Advertisement Server 302, the advertisement campaign data is stored in the Rules Engine 308.

In various embodiments of the present invention, using advertisement campaign data, Rules Engine 308 defines rules for setting frequency and mix of RBTs and advertisements to be played to subscribers based on rate plans and terms of service agreed upon between TSP and subscribers. In an embodiment of the present invention, frequency and mix of RBTs and advertisements are defined for a callee if the callee is an RBT subscriber. In another embodiment of the present invention, frequency and mix of RBTs and advertisements are defined for callers of a callee, if the callee is an RBT subscriber. In yet another embodiment of the present invention, frequency and mix of RBTs and advertisements are defined for callers belonging to the same telecommunication circle as the callee. In yet another embodiment of the present invention, frequency and mix of RBTs and advertisements are defined for callers belonging to a different telecommunication circle as the callee. In yet another embodiment of the present invention, frequency and mix of RBTs and advertisements are defined based on caller's profile. In yet another embodiment of the present invention, frequency and mix of RBTs and advertisements are defined based on callee's profile. In yet another embodiment of the present invention, the frequency and mix of RBTs and advertisements for subscribers are defined based on respective terms of service agreements of TSP 301 with subscribers (callees and/or callers). A terms of service agreement may take into account criteria including, but not limited to, Telecom Circle of caller, origin of caller's TSP, ratio of RBTs to Advertisements for callers that belong to same TSP as the callee, ratio of RBTs to Advertisements for callers of TSP which do not belong to same TSP as callee, type of advertisements that are to played based on caller's/callee's profiles (e.g. telecom products/services, value-added products/services, external products/services such as soft drinks, cable television service, sports products, Automobile products, etc.), frequency of particular advertisement to be played to a caller of same TSP as callee, caller of TSP other than that of the callee, etc.

In other embodiments of the present invention, Rules Engine 308 automatically defines rules setting frequency and mix of RBTs and advertisements based on universal criteria set for a group of subscribers, wherein the subscriber group can include, but is not limited to, group containing RBT subscribers within a telecom circle, or a subscriber group based on any other parameter, or as defined in various rate plans and terms of services offered.

For implementing rules in Rules Engine 308, it may be necessary to determine origin of caller's network. Compensation System 304 includes Cross TSP Database 312 for identifying origin of caller's network, including his Telecommunication Circle, based on the prefix of the caller's Mobile Subscriber's Integrated Services Digital Network Number (MSISDN). In an embodiment of the present invention, origin of caller's network is identified through a data input received from a system such as the MSC of caller's TSP or via an automated data upload giving the current location of the caller. Cross TSP Database 312 includes information, not limited to, data regarding prefixes across all TSPs which is updated periodically based on updates available on Public Websites, and specific inputs if any from other sources. Cross TSP Database 312 also comprises user profile information, MSISDN wise, of the caller and the callee.

In an embodiment of the present invention, Tracking Module 310 keeps track of the last played Media file and history of media files played to the caller of particular callee, ie. callee wise and caller wise, for all the callers to a particular callee or for calls made by a caller who is a subscriber, based on rules defined in the Rules Engine 308. Last played media file to caller of particular callee may be an RBT file or an advertisement. A record of last played media file is maintained by Tracking Module 310. Based on determination of last played media file and various other factors including, but not limited to, RBT to Advertisments ratio corresponding to subscriber based on TSP of caller, type of advertisements to be played to callers of particular TSP, frequency of specific advertisement to be played for a particular TSP and campaign details received from the Campaign Controller (shown in FIG. 2), Tracking Module 310 determines which advertisement media file is to be played for a particular call, if it has been determined by Advertisement Server 302 that an advertisement is to be played for a particular call. After determining a specific media file to be played, Tracking Module provides an identifier to Tone Player 334 of RBT System 328 for playing the media file which is already stored in Tone Player 334. In the scenario where it is determined by the Tracking Module 310 that an RBT set by the subscriber is to be played, then Tracking Module 310 directs Tone Player 334 to play RBT set by the subscriber. Tone Player 334 then determines from tone player database an RBT ID of the subscriber and plays the RBT set by the subscriber.

For direct activation of services advertised through RBT's, Advertisement Server 302 includes Response Execution System 306. An advertisement delivered as part of a callee's RBT provides options to caller for providing response as Dual Tone Multi-Frequency (DTMF) inputs. In an embodiment of the present invention, the response of DTMF inputs given by a caller is recorded in Response Recording Module 314 along with caller's MSISDN and an identifier of advertisement to which the response was given. Response Execution Module 316 then polls up responses from Response Recording Module 314 along with the caller's MSISDN and advertisement identifier, and then checks against a set of rules and conditions set in the Response Execution Module 316 for the particular advertisement identifier. If response from the caller in the form of DTMF input matches with rules and conditions set in the Response Execution Module 316 for the particular advertisement identifier, it initiates an action configured at the time of setting of campaigns in Data Center (shown in FIG. 2). The actions may include the following: In an exemplary embodiment of the present invention, a required action to be initiated as an executable by Response Execution Module 316 to a response given by caller in the form of DTMF input could be to send in a Short Message Service (SMS) message detailing information required by the caller in the form of an SMS. This action is initiated through a Short Message Service Center (SMSC) 322. In another exemplary embodiment of the present invention, an action to be initiated as an executable, by Response Execution Module 316 could be activation of service desired by caller, as detailed in the advertisement delivered to the caller. Response Execution Module 316 triggers a particular telecom/value-added service activation request URL configured for corresponding advertisement identifier and by using details of caller's MSISDN, details of service requested for and the mode from which the request was captured. Service activation is performed through Service Activation System 320. In yet another exemplary embodiment of the present invention, required action to be initiated as an executable, by Response Execution Module 316 could be to initiate an Automated Outbound Dialer System (AOBD) 326 call on behalf of an advertiser and to connect the caller to the advertiser for any further information requirement or information gathering for the caller, as well as the advertiser. AOBD call is delivered by Advertisement Server 302 through AOBD module 326. In yet another exemplary embodiment of the present invention, required action to be initiated as an executable, by Response Execution Module 316 could be to send in an email alert to an advertiser of advertisement played as ring back tone received by caller. The Response Execution Module 316 then initiates an email to a pre-configured email-id and including MSISDN of the caller and including response to the particular advertisement as selected by the caller by pressing DTMF key. The email is delivered to pre-configured email-id through Email Notification Module 324.

In an embodiment of the present invention, responses received by Response Recording Module 314 corresponding to multiple advertisers can be collated into an End of Day Report by Reports Module 318. The report can be emailed to pre-configured email-id's of advertisers along with information including, but not limited to, MSISDNs of callers and their corresponding responses through Email Notification Module 324.

FIGS. 4 and 5 illustrate a flowchart depicting a sequence of steps for providing compensation to telecommunication users and enabling direct activation of advertised services. As shown in the figure, at step 402, a call initiated by a caller is received by a Mobile Switching Center (MSC) of a callee's (RBT subscriber's) TSP. In an embodiment of the present invention, at step 404, MSC establishes status of callee (RBT subscriber) by checking HLR of the TSP. In an embodiment of the present invention, if it is determined that either the callee or caller is an RBT subscriber or is subscribed for delivering advertisements, MSC transfers call to tone player within RBT system. If it is determined that the callee is subscribed for delivering advertisements to callers, tone player invokes Compensation System API at step 406 and sends caller's as well as callee's information to the Compensation System.

Thereafter, at step 408, Compensation System checks in TSP database whether the caller to the particular callee is from the same TSP or from another TSP and Telecommunication Circle of the callee. At step 410, last played media file for the caller is determined, i.e. whether the last played media file was an RBT or an advertisement. Thereafter, at step 502, media file to be played to the caller is determined by the Compensation System. The media file to be played may be an advertisement or an RBT and is determined based on pre-defined RBT to Advertisement ratios for subscribers of the TSP stored within Rules Engine in the Compensation System. In various embodiments of the present invention, RBT to Advertisement ratios may be defined for callees as well as callers based on rate plans and terms of service agreed upon between the TSP and subscribers. RBT to advertisement ratios are defined based on criteria specified in terms of service such as callers belonging to same telecommunication circle as callee, callers belonging to different telecommunication circle as callee, caller's profile information, callee's profile information etc.

In an embodiment of the present invention, profile based targeting may be used for providing advertisements to callers. Thus, if it is determined at step 502 that a media file to be played to a caller is an advertisement using profile based targeting, an advertisement is selected based on callee's (subscriber) as well as caller's profile. For selecting the advertisement to be played, the first priority is given to caller's profile information i.e. the selected advertisement is based on caller's profile information. If the caller's profile information indicates an interest in music, the advertisement selected to be played to the caller is related to music. However, if the Compensation system does not have caller's profile information, then it uses the callee's (subscriber's) profile information as a targeting parameter for providing an advertisement to the caller. Using the callee's profile information for providing advertisement to the caller is based on the premise that the caller would be of a similar social group as that of the subscriber/callee. In another embodiment of the present invention, profile based targeting may be used for providing advertisements to callers who are RBT subscribers. In such a case, when a caller calls a callee, and if it is determined at step 502 that the media file to be played to the caller is an advertisement, an advertisement is selected based on caller's profile information. If the caller's profile information indicates an interest in sports, the advertisement selected to be played to the caller is related to sports.

Following the determination of media file to be played to the caller, at step 504, Compensation system provides an identifier to Tone Player of RBT system for playing the media file, if it is determined that an advertisement is to be played. However, if it is determined that an RBT is to be played, Compensation System directs tone player within RBT system to play the RBT. Thereafter, at step 506, an action selected by the caller as a response to the advertisement is initiated by the Response Execution System. In various embodiments of the present invention, action initiated may include, but is not limited to, service activation, sending an SMS or email to subscriber, triggering an Automated Outbound Dialer, sending an email report to pre-configured email identifiers.

In various embodiments of the present invention, response given by caller may be in the form of DTMF inputs. In order to increase probability of getting a definite DTMF response from a caller before the callee answers the call or the advertisement ceases to play, an early response solicitation method is used in the present invention. In the early response solicitation method an optimal time frame for which an advertisement can be heard by the caller so that he can provide a response is decided based on data collected from the Tone Player by a Response Recording System. A Response Recording system records the usual length of time an advertisement media file was played to the caller before the call was picked up by the callee.

The system for compensating telecommunication subscribers and direct action of advertised services may be embodied in the form of a computer system. Typical examples of a computer system includes a general-purpose computer, a programmed microprocessor, a micro-controller, a peripheral integrated circuit element, and other devices or arrangements of devices that are capable of implementing the steps that constitute the method of the present invention.

The computer system comprises a computer, a microprocessor, an input device, a display unit and among other units of a computer. The microprocessor is connected to a communication bus. The computer also includes a computer usable medium such as a memory containing computer readable program codes. The memory may include Random Access Memory (RAM) and Read Only Memory (ROM). The computer system further comprises a storage device. The storage device can be a hard disk drive or a removable storage drive such as a floppy disk drive, optical disk drive, etc. The storage device can also be other similar means for loading computer programs or computer readable program code or other instructions into the computer system. The computer system also includes a communication unit. The communication unit allows the computer to connect to other databases and computers on a network through an I/O interface. The communication unit allows the transfer as well as reception of data from other databases. The communication unit may include a modem, an Ethernet card, or any similar device which enables the computer system to connect to databases and networks such as LAN, MAN, WAN, and the Internet. The computer system facilitates inputs from a user through input device, accessible to the system through I/O interface.

The computer system executes a set of program instruction means that are stored in one or more storage elements, in order to process input data. The storage elements may also hold data or other information as desired. The storage element may be in the form of an information source or a physical memory element present in the processing machine.

The set of instructions may include various commands that instruct the processing machine to perform specific tasks such as the steps that constitute the method of the present invention. The set of instructions may be in the form of a software program. Further, the software may be in the form of a collection of separate programs, a program module with a larger program or a portion of a program module, as in the present invention. The software may also include modular programming in the form of object-oriented programming. The processing of input data by the processing machine may be in response to user commands, results of previous processing or a request made by another processing machine.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

What is claimed is:

1. A system for serving advertisements as ring back tones (RBTs) for subscribers of a telecommunication service provider (TSP), the system comprising:
  a mobile switching centre (MSC) associated with a caller;
  an MSC associated with a callee;
  one or more RBT systems, the one or more RBT systems each comprise one or more signaling cards with associated signaling links for playing the RBTs to the caller, wherein when the callee answers a call from the caller, the MSC of the callee sends a release message, via the signaling link, to the one or more RBT systems to stop playing the RBT to the caller;
  a data center operationally connected to the TSP and comprising:
    a user interface configured to be used by one or more users for creating campaigns, wherein creating campaigns comprises specifying advertisement messages to be played based on one or more targeting parameters;
    a campaign database configured to store advertisement messages created by the one or more users; and
    a campaign controller configured to manage delivery of advertisements to a server for playing, and further configured to control frequency and exposure of advertisements per campaign per user based on inputs given by the one or more users; and
  an advertisement server located within a network of the TSP and communicatively coupled to the one or more RBT systems of the TSP network, the advertisement server is configured to:
    receive delivery of advertisements and campaign data from the campaign controller;
    store media files as advertisements in databases within the one or more RBT systems of the TSP network;
    determine the media file to be played to the caller based on received advertisements and campaign data, wherein the determined media file is then played to the caller in a duration before the callee answers the call and is stopped upon receiving and acknowledging the release message from the MSC of the callee, further wherein the call request from the caller is kept on hold at the MSC of the callee till an appropriate media file to be played to the caller is determined;

establish frequency and mix of non-advertisement based RBT and advertisements to be played to the caller of the callee when neither the callee nor the caller are subscribed to the RBT; and establish frequency and mix of non-advertisement based RBT and advertisements to be played to the caller, when the caller is not subscribed to the RBT, by interleaving the non-advertisement based RBT with the advertisements based on pre-defined criteria derived from the one or more targeting parameters.

2. The system of claim 1, wherein the user is at least one of an advertiser, a sales agency, a TSP and a third party agency involved in creating or managing advertisement campaigns.

3. The system of claim 1, wherein the one or more targeting parameters comprises at least one of callee profile, caller profile, location of caller, location of callee, telecommunication circle where caller is located, telecommunication circle where callee is located, time of day during which call is made by caller and time of day during which call is received by callee.

4. The system of claim 1, wherein pre-defined criteria comprises at least one of telecommunication circle of caller, origin of caller's TSP, ratio of the non-advertisement based RBT to advertisements for callers that belong to same TSP as callee, ratio of the non-advertisement based RBT to advertisements for caller of TSP which do not belong to same TSP as callee and type of advertisements to be played and frequency of particular advertisement to be played to particular caller.

5. The system of claim 4, wherein the advertisement server further comprises:
  a compensation system comprising:
    a rules engine configured to define rules for setting frequency and mix of the non-advertisement based RBTs and advertisements to be played to callers based on rate plans and terms of service agreed upon between the TSP and subscribers, wherein the terms of service are based on the pre-defined criteria;
    a cross TSP database configured to identify origin of caller's network; and
    a tracking module configured to:
      keep track of last played media file to caller and history of media files played,
      and further configured to:
      provide identifiers to tone players of the one or more RBT systems for playing advertisement media files,
      and further configured to:
      direct tone players to play RBT files;
  and
  a response execution system comprising:
  a response recording module configured to record response of caller provided in a form of dual tone multi-frequency (DTMF) inputs; and
  a response execution module configured to poll up responses from the response recording module along with caller's mobile subscriber's integrated services digital network number (MSISDN) and advertisement identifier and to ascertain rules and conditions set for the advertisement identifier, and further configured to initiate an action in conformance with caller responses.

6. The system of claim 5 further comprising a service activation system operationally connected to the response execution module and configured to directly activate a service selected by the caller in the form of DTMF inputs.

7. The system of claim 5 further comprising a short message service center operationally connected to response execution module and configured to send a short message service message as a response selected by caller in the form of DTMF inputs and initiated by the response execution module.

8. The system of claim 5 further comprising an email notification module operationally connected to response execution module and configured to deliver an email to a pre-configured email-id including mobile subscriber's integrated services digital network number (MSISDN) of caller and in response to advertisement played to the caller.

9. The system of claim 5 further comprising an automated outbound dialer system (AOBD) system configured to connect a caller to an advertiser in response to a DTMF input response by the caller.

10. The system of claim 5 further comprising a reports module configured to collate responses received by response recording module into an end of day report.

11. The system of claim 10, wherein the reports module is further configured to email end of day report to pre-configured email-id's of advertisers along with information such as MSISDNs of callers and their corresponding responses.

12. The system of claim 5, wherein the tracking module is operationally connected to tone players of the one or more RBT systems via low latency connectivity.

13. A method for serving advertisements as ring back tones (RBTs) for subscribers of a telecommunication service provider (TSP), the method comprising:
  receiving a call at a TSP mobile switching center (MSC) of a callee, wherein the call is initiated by a caller;
  establishing status of the caller and the callee by checking a home location register (HLR) of the TSP, wherein establishing status comprises determining RBT subscription status of the one or more callers and the callee;
  transferring the call to one or more RBT systems, the one or more RBT systems each comprise one or more signaling cards with associated signaling links for playing the RBTs to the caller, wherein when the callee answers a call from the caller, the MSC of the callee sends a release message, via the signaling link, to the one or more RBT systems to stop playing the RBT to the caller;
  creating campaigns by specifying advertisement messages to be played based on one or more targeting parameters;
  controlling frequency and exposure of advertisements per campaign per user based on inputs given by one or more users;
  delivering the advertisements and campaign data to an advertisement server;
  invoking a compensation system at the advertisement server for checking whereabouts of the one or more callers;
  determining a media file to be played to the caller based on the received advertisements and campaign data, wherein the determined media file is played to the caller in a duration before the callee answers the call and is stopped upon receiving and acknowledging the release message from the MSC of the callee, further wherein the call request from the caller is kept on hold at the MSC of the callee till an appropriate media file to be played to the caller is determined;

establishing, when neither the callee nor the one or more callers are subscribed to the RBT, frequency and mix of non-advertisement based RBT and advertisements to be played to the caller of the callee;

establishing, when the caller is not subscribed to the RBT, frequency and mix of non-advertisement based RBT and advertisements to be played to a caller by interleaving the non-advertisement based RBT with the advertisements based on pre-defined criteria derived from one or more targeting parameters; and playing the media file to the caller, wherein the media file is at least one of a non-advertisement based RBT file and an advertisement message.

14. The method of claim 13 further comprising determining last played media file played for a caller prior to determining media file to be played to the caller.

15. The method of claim 13 further comprising applying a higher priority to caller's profile information with respect to callee's profile information, if it is determined that an advertisement message is to be played as a media file using profile based targeting.

16. The method of claim 13, wherein if the media file is an RBT file, the tone player plays RBT media file stored in tone player database based on corresponding RBT identifier.

17. The method of claim 13, wherein if the media file is an advertisement message, an advertisement identifier is provided by the compensation system to the tone player for playing the advertisement message.

18. The method of claim 13 further comprising:
recording response of caller to an advertisement provided in a form of dual tone multi-frequency (DTMF) inputs along with callers mobile subscriber's integrated services digital network number (MSISDN) and advertisement identifier;
polling up the recorded response and checking the recorded response against a set of rules and conditions; and
initiating a pre-configured action based on the response.

19. The method of claim 18, wherein the pre-configured action comprises sending an electronic message detailing information required by the caller in the form of a short message service (SMS) message.

20. The method of claim 18, wherein the pre-configured action comprises activating a service selected by the caller as a DTMF response.

21. The method of claim 18, wherein the pre-configured action comprises initiating an automatic outbound dialer system (AOBD) call to connect the caller to the advertiser based on DTMF response selected by the caller.

22. The method of claim 18, wherein the pre-configured action comprises sending an email alert to pre-configured email identifier of an advertiser of the advertisement message played as ring back tone.

23. A computer program product comprising computer usable non-transitory medium having a computer readable program code embodied therein for serving advertisements as ring back tones (RBTs) for subscribers of a telecommunication service provider (TSP), the computer program product configured:
to receive a call at a TSP mobile switching center (MSC) of a callee, wherein the call is initiated by a caller;
to establish a status of the caller and the callee by checking home location register (HLR) of the TSP, wherein establishing the status comprises determining RBT subscription status of the one or more callers and the callee;
to transfer the call to one or more RBT systems, the one or more RBT systems each comprise one or more signaling cards with associated signaling links for playing the RBTs to the caller, wherein when the callee answers a call from the caller, the MSC of the callee sends a release message, via the signaling link, to the one or more RBT systems to stop playing the RBT to the caller;
to create campaigns by specifying advertisement messages to be played based on one or more targeting parameters;
to control frequency and exposure of advertisements per campaign per user based on inputs given by one or more users;
to deliver the advertisements and campaign data to an advertisement server;
to invoke compensation system at the advertisement server for checking whereabouts of the one or more callers;
to determine a media file to be played to the caller based on the received advertisements and campaign data, wherein the determined media file is played to the caller in a duration before the callee answers the call and is stopped upon receiving and acknowledging the release message from the MSC of the callee, further wherein the call request from the caller is kept on hold at the MSC of the callee till an appropriate media file to be played to the caller is determined;
to establish, when neither the callee nor the one or more callers are subscribed to the RBT, frequency and mix of non-advertisement based RBT and advertisements to be played to the caller of the callee; and
to establish, when the caller is not subscribed to the RBT, frequency and mix of non-advertisement based RBT and advertisements to be played to a caller by interleaving the non-advertisement based RBT with the advertisements based on pre-defined criteria derived from the one or more targeting parameters; and
to play the media file to the caller, wherein the media file is at least one of a non-advertisement based RBT file and an advertisement message.

24. The computer program product of claim 23 further configured to determine a last played media file played for a caller prior to determining media file to be played to the caller.

25. The computer program product of claim 23 further configured to apply a higher priority to caller's profile information with respect to callee's profile information, if it is determined that an advertisement message is to be played as a media file using profile based targeting.

26. The computer program product of claim 23 further configured to:
to record a response of caller to an advertisement provided in a form of dual tone multi-frequency (DTMF) inputs along with callers mobile subscriber's integrated services digital network number (MSISDN) and advertisement identifier;
to poll up the recorded response and checking the recorded response against a set of rules and conditions; and to initiate a pre-configured action based on the recorded response.

* * * * *